US 8,550,923 B2

(12) United States Patent
Piazzai et al.

(10) Patent No.: US 8,550,923 B2
(45) Date of Patent: Oct. 8, 2013

(54) ELECTRONIC TERMINAL HAVING AN UPPER COVER WITH A DISPLAY SCREEN

(75) Inventors: Luciano Piazzai, Avezzano (IT); Antonio Croce, Capistrello (IT)

(73) Assignee: Telecom Italia S.p.A., Milan (IT)

( * ) Notice: Subject to any disclaimer, the term of this patent is extended or adjusted under 35 U.S.C. 154(b) by 768 days.

(21) Appl. No.: 10/548,426

(22) PCT Filed: Mar. 12, 2004

(86) PCT No.: PCT/IT2004/000122
§ 371 (c)(1),
(2), (4) Date: Sep. 8, 2005

(87) PCT Pub. No.: WO2004/081704
PCT Pub. Date: Sep. 23, 2004

(65) Prior Publication Data
US 2006/0183554 A1    Aug. 17, 2006

(30) Foreign Application Priority Data
Mar. 12, 2003    (IT) .............................. TO20030042 U

(51) Int. Cl.
*A63F 9/24*        (2006.01)
*A63F 13/00*       (2006.01)
*G06F 17/00*       (2006.01)
*G06F 19/00*       (2011.01)

(52) U.S. Cl.
USPC .............................................. 463/46; 463/47

(58) Field of Classification Search
USPC .......................................................... 463/46
See application file for complete search history.

(56) References Cited

U.S. PATENT DOCUMENTS

| 4,882,473 A | 11/1989 | Bergeron et al. |
| 5,678,937 A | 10/1997 | Smith et al. |

(Continued)

FOREIGN PATENT DOCUMENTS

| EP | 0 261 761 A2 | 3/1988 |
| EP | 0 947 337 A2 | 10/1999 |

(Continued)

OTHER PUBLICATIONS

Horikoshi et al., "Flat Display Tilt Mechanism", Mar. 1990, pp. 442-443.

(Continued)

*Primary Examiner* — Dmitry Suhol
*Assistant Examiner* — Kevin Y Kim
(74) *Attorney, Agent, or Firm* — Venable LLP; Robert Kinberg; Steven J. Schwarz

(57) ABSTRACT

An electronic terminal (10), in particular for the management of games, comprising an upper cover (16) fulcrum-mounted on a fixed external structure (11) and suitable for assuming, with respect to the latter, a closed position (P1) and an open position (P2), in which the upper cover (13) is made of a first part (13*a*), arranged adjacently to the relative fulcrum-mounting area (17) on the fixed structure (11), and a second part (13*b*), arranged away from the fulcrum-mounting area (17), which bears a keyboard (14) for the entry of data, and in which a screen (16) for displaying data is rotatingly mounted on a central area (13*c*) of the cover, between the first (13*a*) and the second part (13*b*), so as to be adjustable with respect to the fixed structure (11) when the upper cover (13) is in the closed position (P1). To advantage, the terminal (10) comprises a front access door (31*a*) suitable for being easily removed as a single piece from a respective seat made in the fixed structure (11), thereby freeing and completely uncovering a path (27) for reading of games coupons (28) inserted in the terminal (10).

5 Claims, 3 Drawing Sheets

(56) References Cited

U.S. PATENT DOCUMENTS

| | | | |
|---|---|---|---|
| 5,710,415 A * | 1/1998 | Kono et al. | 235/7 R |
| 5,941,618 A * | 8/1999 | Cheng | 312/223.2 |
| 6,040,978 A * | 3/2000 | Spencer | 361/679.27 |
| 6,152,630 A * | 11/2000 | Scarton et al. | 400/642 |
| 6,710,895 B1 * | 3/2004 | Gatto et al. | 358/1.6 |
| 6,781,604 B2 * | 8/2004 | Poynter | 345/690 |
| 7,017,803 B2 * | 3/2006 | Ichikawa et al. | 235/379 |
| 2002/0116217 A1 * | 8/2002 | Yamakawa et al. | 705/1 |
| 2002/0183106 A1 * | 12/2002 | Cole | 463/16 |
| 2003/0021086 A1 * | 1/2003 | Landry et al. | 361/683 |
| 2003/0047609 A1 * | 3/2003 | Endo et al. | 235/454 |
| 2005/0032578 A1 * | 2/2005 | Cole | 463/46 |
| 2006/0102723 A1 * | 5/2006 | Delaney et al. | 235/454 |

FOREIGN PATENT DOCUMENTS

| | | |
|---|---|---|
| JP | 05 035739 A | 2/1993 |
| JP | 05035739 | 2/1993 |
| JP | 2002223825 | 8/2002 |
| WO | WO 90/01199 A | 2/1990 |

OTHER PUBLICATIONS

Patent Abstracts of Japan vol. 017, No. 326, Jun. 21, 1993.

* cited by examiner

US 8,550,923 B2

ELECTRONIC TERMINAL HAVING AN UPPER COVER WITH A DISPLAY SCREEN

This application is a National Stage application of co-pending PCT application PCT/IT2004/000122 filed 12 Mar. 2004, which was published in the English language under PCT Article 21(2) on 23 Sep. 2004, and claims the benefit of the IT. Application No. TO2003U000042 filed 12 Mar. 2003.

FIELD OF THE INVENTION

This invention relates to an electronic terminal particularly, though not exclusively, suitable for managing games, having the features defined by the introductory part of the first main independent claim, i.e. comprising a fixed outer structure, a printer housed inside the fixed structure, an upper cover fulcrum-mounted on the fixed structure to assume a closed position on the fixed structure, and an open position, raised with respect to the fixed structure and such as to allow access to the inside of the printer, a keyboard for entering data, and a screen for displaying data and information processed by the same terminal.

TECHNOLOGICAL BACKGROUND TO THE INVENTION

The current state of the art offers a vast range of terminals provided with keyboard and display screen, for use in managing games, such as those which are known in Italy as "Totocalcio", associated with football pools, or "Enalotto" corresponding to a national lottery, and others.

In particular, in connection with these games, these terminals are designed to read the data marked on documents, such as coupons, compiled by the user of the terminal, i.e. by the player, and to provide the latter with a certificate or receipt indicating the bet made.

Generally these terminals are provided for installation in betting offices, and/or various types of public places, such as bars and others, distributed throughout the country to allow the users to make bets.

Obviously these terminals for games, considering the kind of use they are intended for, must be conforming to certain requirements, and among other things they must be able to satisfy requirements of comfort, practicality and ease of use, both for the players who use the terminals to place their bets, and for the operators of the relative points of installation, who are responsible for supervising and acting to keep the terminals constantly in good working order.

SUMMARY OF THE INVENTION

A first object that this invention has set to attain is therefore that of producing an electronic terminal particularly, though not exclusively, suitable for use in the management of games, that can offer performances, in terms of comfort, practicality and ease of use and maintenance, considerably better than those offered by the currently existing terminals.

A second object of this invention is that of defining a games terminal that integrates, in a highly compact structure permitting smooth installation of the terminal in the public places authorized to receive bets, the functions of data entry, reading coupons or other documents with data compiled by the player, displaying the data and/or other information entered, and issuing a receipt as proof of the bet made.

The above objects are achieved by the electronic terminal having the characteristics set down in the first main independent claim.

These and other objects, characteristics and advantages of this invention will come across in clear and transparent fashion in the following description of a preferred embodiment, provided by way of non-restrictive example, with reference to the accompanying drawings.

DESCRIPTION OF A PREFERRED EMBODIMENT OF THE INVENTION

With reference to FIGS. 1-4, an electronic terminal, made according to the present invention, is indicated generically with numeral 10.

As a general rule, the electronic terminal 10 is intended for being used in a variety of applications, but preferably, even though not exclusively, it is intended for use in the management of games, chiefly to receive and process documents compiled with the game data by numerous players, and to issue to each of the former a receipt testifying to the gaming operation effected.

In greater detail, the electronic terminal 10 possesses a generally parallelepiped shape, which has a front side 10a, facing the operator of the terminal 10, and a rear side 10b.

Figure 1:
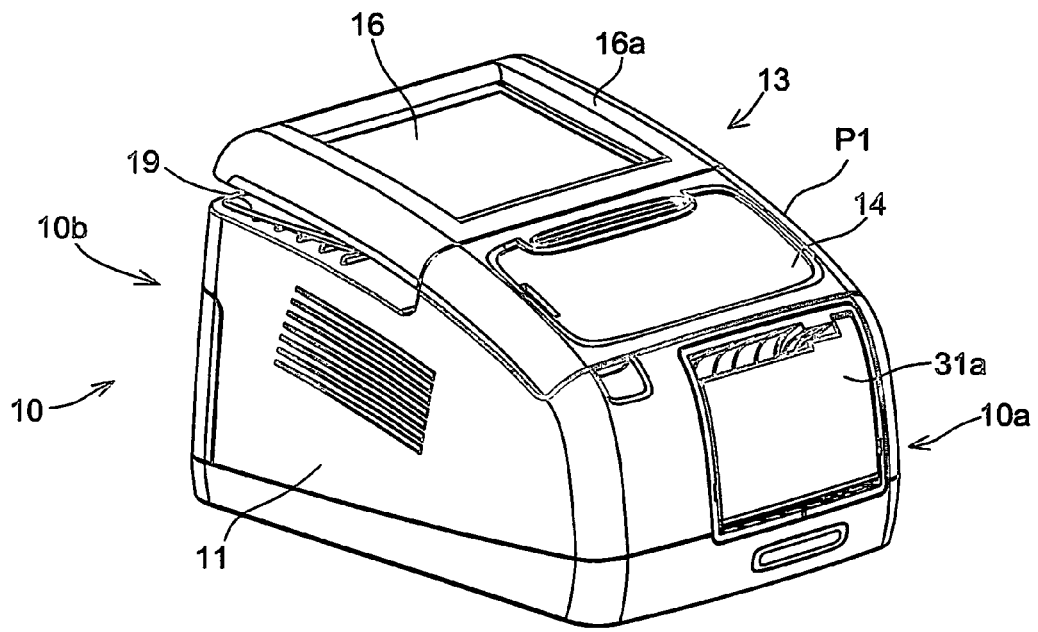
FIG. 1 is a front perspective view of a terminal, in particular for controlling games, according to the present invention, in a first operating configuration with a closed upper cover and a display screen folding on the cover.
Figure 2:
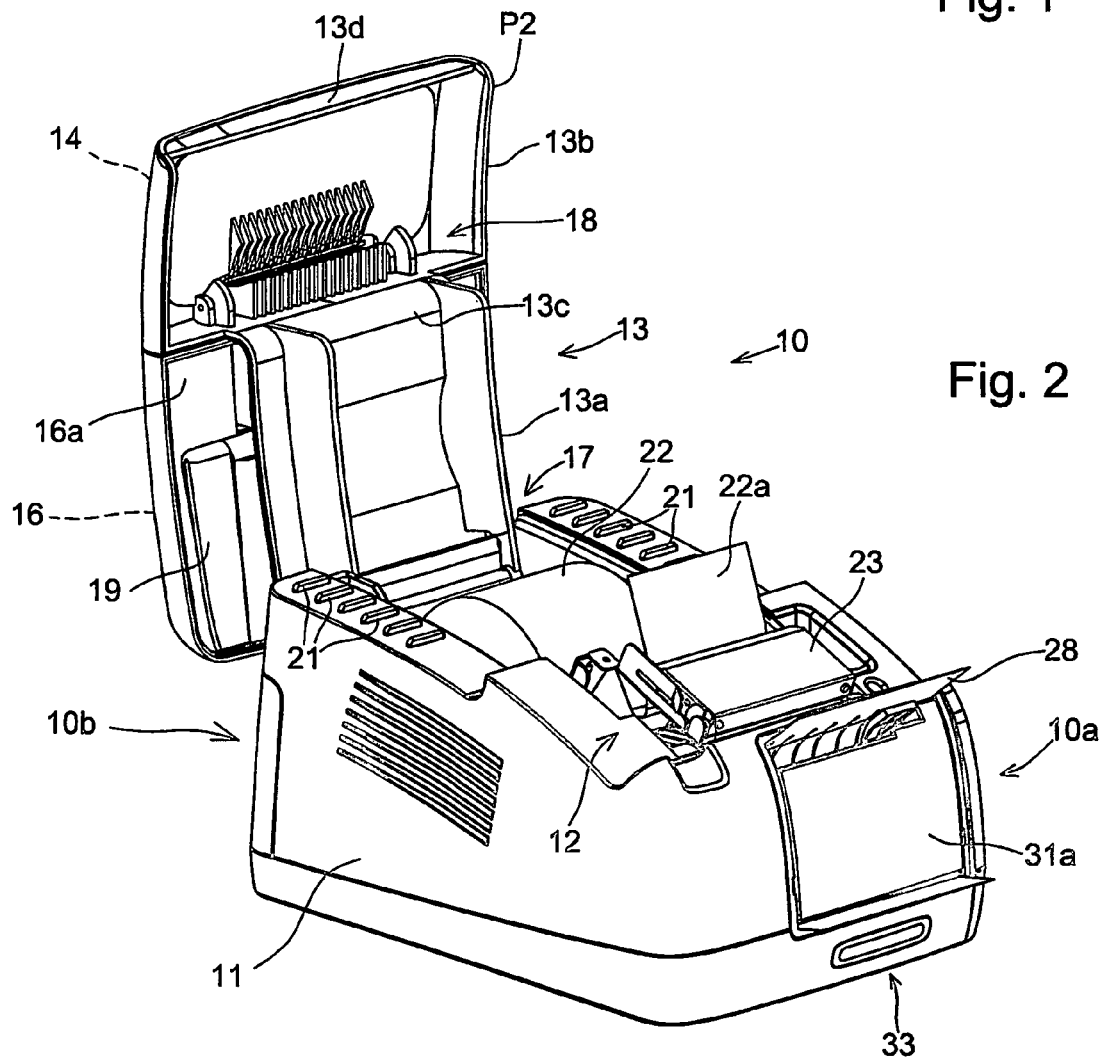
FIG. 2 is a front perspective view of the terminal of FIG. 1, in a second operating configuration with the upper cover open.
Figure 3:
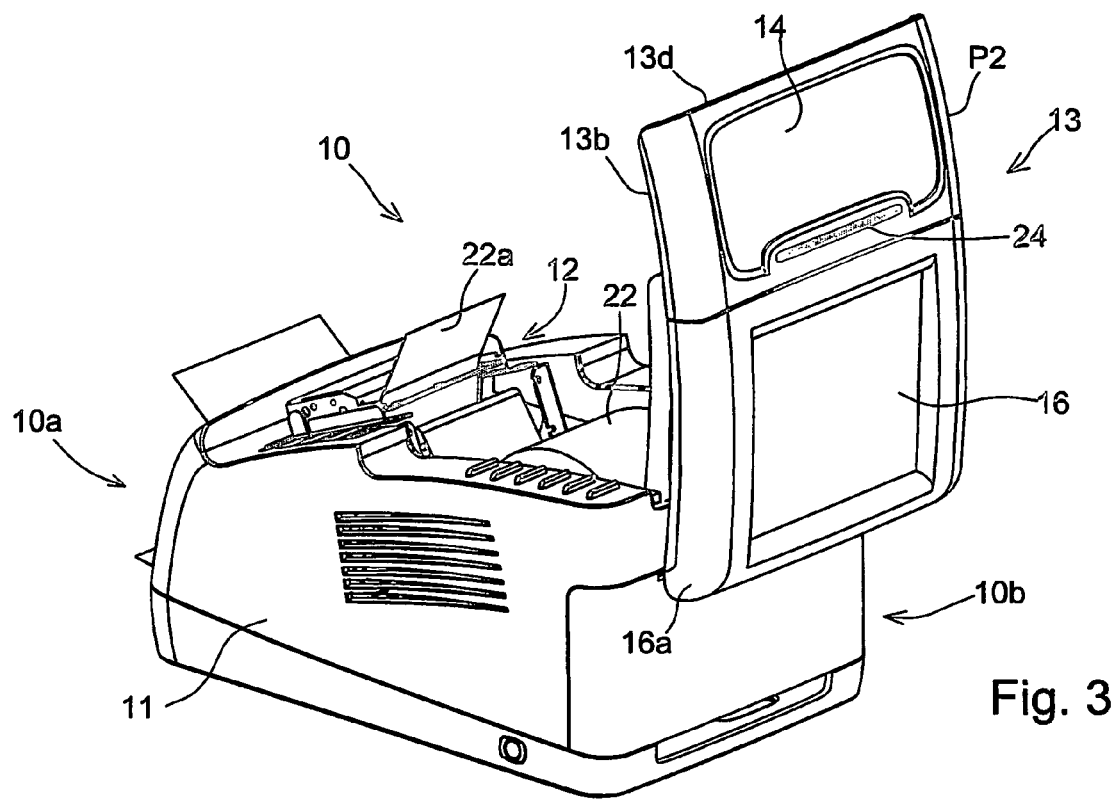
FIG. 3 is a rear perspective view of the terminal of FIG. 2, with the relative upper cover open.

In addition, the terminal 10 comprises a fixed external structure 11, which also constitutes an outer casing for the terminal 10; a printer 12, housed inside the structure 11; an upper cover 13 fulcrum-mounted on the fixed structure 11 and suitable for assuming a closed position indicated with P1, flush with the structure 11, as shown in FIG. 1, and an open position indicated with P2, raised with respect to the fixed structure 11 and suitable to allow access to the inside of the terminal 10, in particular to the printer 12, as shown in FIG. 2.

The upper cover 13 is fulcrum-mounted on the fixed structure 11 by means of a hinge-type connection, generically designated with the numeral 17, arranged towards the top along the rear side 10b of the terminal 10.

The terminal 10 also comprises a keyboard 14, of known type, allowing the user to enter data and commands suitable for controlling the terminal 10, and a screen 16, also of known characteristics, for displaying data and information processed by the terminal 10.

The keyboard 14 is preferably of the flat, membrane type, comprising a sheet bearing numerous alphanumeric symbols, each associated with a transducer suitable for converting into a corresponding signal the pressure exerted on it by the user.

In turn, the display screen 16 is rigidly mounted on a support frame 16a and is preferably of the liquid crystal type which implies limited thickness.

The printer 12, housed inside the casing 11, is preferably of the dot matrix type, for instance operating according to the so-called thermal technology, and is provided for printing data and information on a slip of paper 22a coming from a roll 22, in turn accommodated in a respective seat 26 (FIG. 6), also formed inside the casing 11 of the terminal 10.

The printer 12 is also associated with a cutter 23 the function of which is to cut the slip of paper 22a, after it has been printed, so as to produce a receipt 22b (FIG. 4) to be issued to the user of the terminal 11 at the end of the gaming operations, as shown schematically by the arrow 25.

In particular this receipt 22b is suitable for reproducing the gaming data marked by a user on a games coupon, which has first been inserted into the terminal 10, where it is read, as will be described in greater detail below.

According to a principal feature of the present invention the object of which is to make the electronic terminal 10 especially practical to use, in particular whenever used for managing games, the relative upper cover 13 consists of a first part, indicated with 13a (FIG. 2), adjacent to the fulcrum-mounting zone of the cover 13 on the fixed structure 11, i.e. to the hinge 17, and a second part, indicated 13b, away from the hinge 17 and defining a free edge 13d of the cover 13, in which this second part 13b is intended to support the keyboard 14 for entering data, and in which in addition the screen 16 for displaying data is rotatingly mounted, by means of a hinge 18, on a central area of the cover 13, indicated 13c, between the first and the second part, 13a and 13b respectively.

Figure 4:
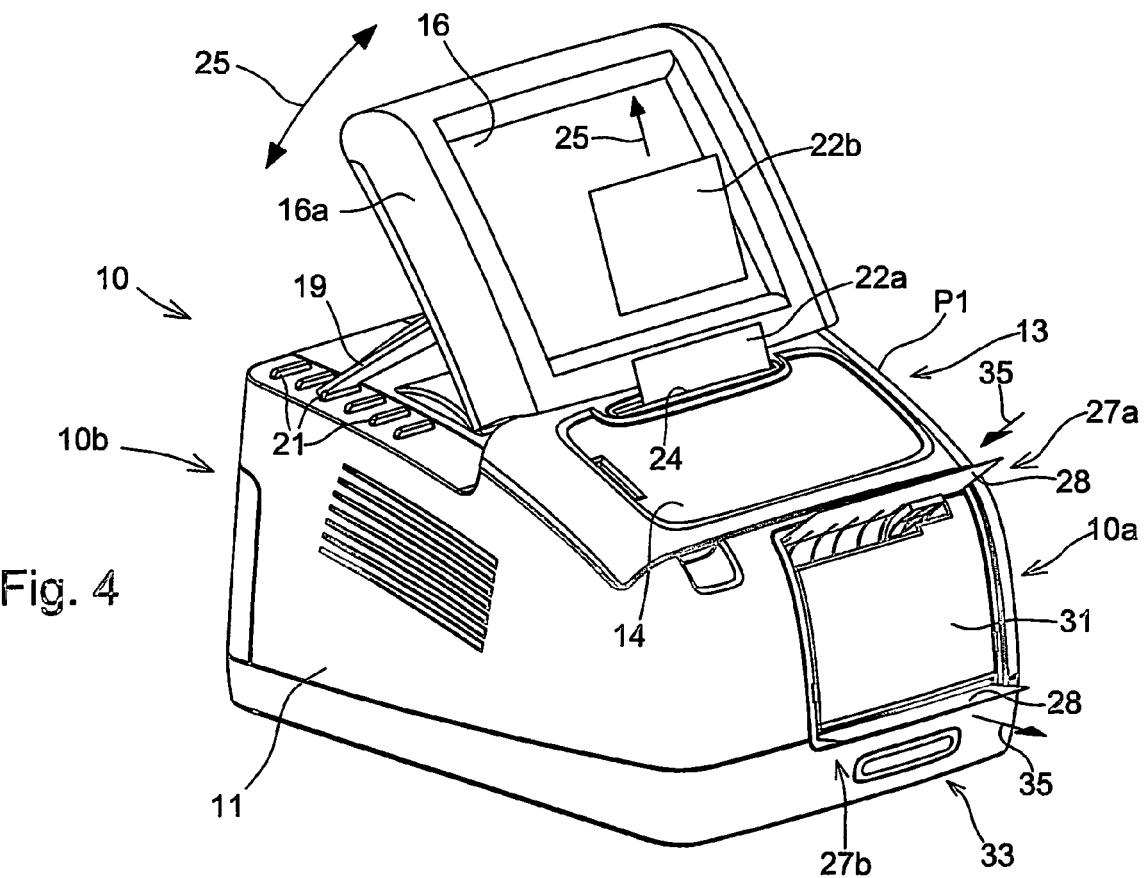
FIG. 4 is a front perspective view of the terminal of FIG. 1, in a third working configuration with the upper cover closed and the display screen raised with respect to the cover.

Therefore, in this configuration, the keyboard 14 is arranged adjacent to the free edge 13d, opposite the fulcrum-mounted edge, of the cover 13, while the display screen 16, thanks to the hinge 18, is of such a type that it may be suitably regulated, according to the desired angle of tilt, with respect to the fixed structure 11, i.e. with respect to the cover 13 when the latter is in the relative closed position P1, as indicated by the double arrow in FIG. 4.

For this purpose the display screen 16 is suitably associated with support posts 19 having one end fulcrum-mounted on the structure 16a supporting the display screen 16, and the other free end suitable for cooperating with protuberances 21 formed in the outer surface of the structure 11, in such a way as to prop up the display screen 16 in the position corresponding to the desired tilt angle with respect to the cover 13, when the latter is in the relative closed position P1.

Figure 6:
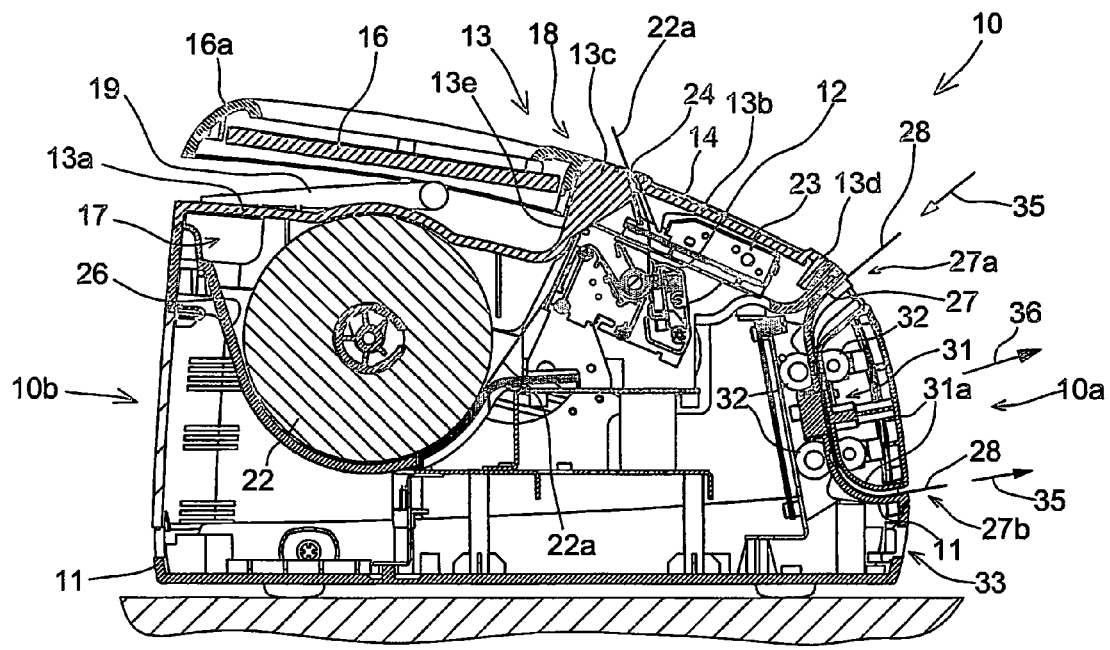
FIG. 6 is a section along a longitudinal median plane of the terminal of FIG. 1, in the relative first operating configuration.
Figure 5:
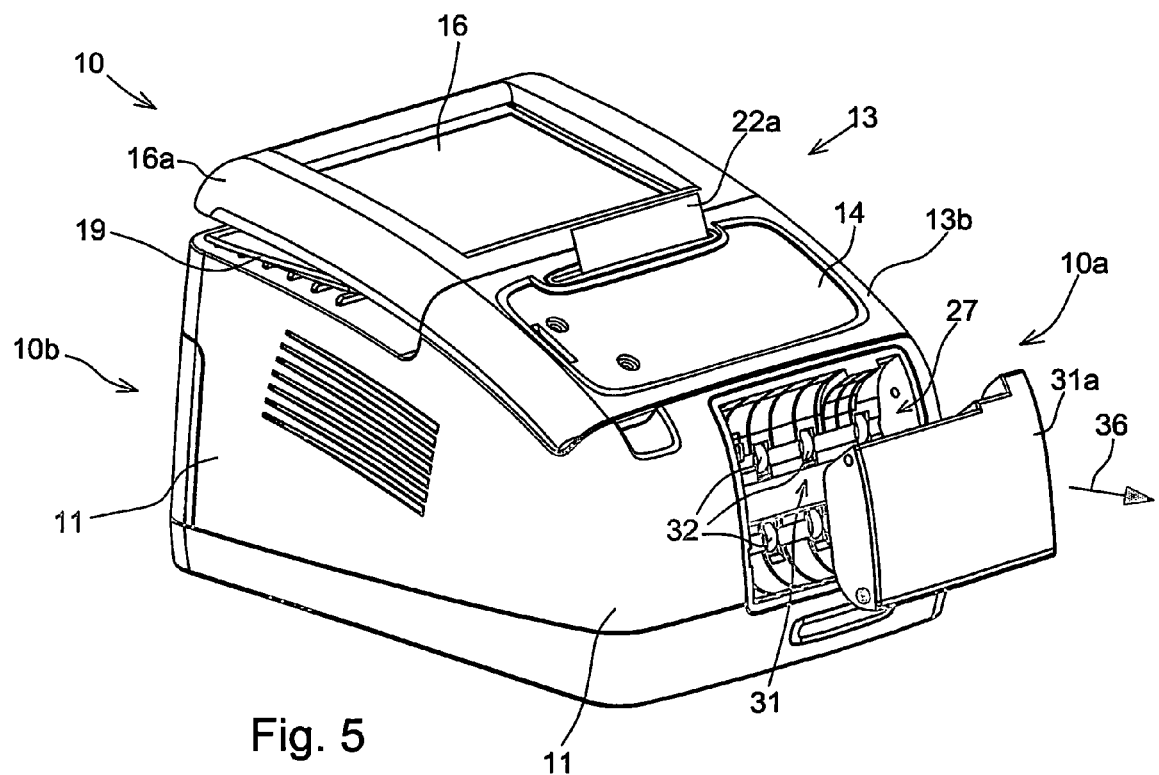
FIG. 5 is an enlarged perspective view of the terminal of FIG. 1, which represents, separately from the other parts, a group for reading games coupons, suitable for insertion in the terminal.

Further, for the purpose of permitting perfect alignment between the surface of the keyboard 14 and the display screen 16, when the latter is completely folded down on the cover 13, the first part 13a of the cover 13, adjacent to the hinge 17, defines a recess 13e suitable for receiving the display screen 16 in this position, as shown in the section of FIG. 6.

A pass-through slot 24 is formed in the second part 13b of the cover 13, parallel to the side of the keyboard 14 that faces the central area of the cover 13, to allow the exit movement of the slip of paper 22a and accordingly the issue of the receipt 22b to the operator of the terminal 10.

As shown in FIG. 4 and in the section of FIG. 6, the terminal 10 also comprises, local to the front side or simply front 10a, a path 27, that extends from an inlet aperture 27a to an outlet aperture 27b, and an optical reader group 31, of known technology, arranged along the path 27.

The path 27 is provided for receiving and guiding a document 28, such as typically a games coupon, inserted by a user in the terminal 10 through the inlet aperture 27a, whereas the function of the optical reader group 31 is to read the games data marked by the user on the coupon 28, and/or other information marked on the coupon, as it is fed along the path 27.

For this purpose, the path 27 is associated with known feeding means, made for instance of rollers 32 arranged along two opposite sides of the path 27, suitable for feeding the coupon 28 along the path 27, after the operator has inserted it in the inlet aperture 27a, and for finally ejecting the same coupon 28 through the outlet aperture 27b, so as to return it to the operator, after the data has been read by the reader 31, as illustrated schematically by arrows 35.

Conveniently the path 27 is delimited, on one side, by the fixed structure 11, and on the other side by an access door 31a (FIG. 6), in turn removably mounted in a respective seat defined by the fixed structure 11, in such a way that it may be easily removed as a single piece and placed, whenever necessary, away from the fixed structure 31, as indicated schematically by an arrow 36.

It is accordingly possible to completely uncover the area of the path 27, for example for cleaning purposes, and also to take action easily and smoothly to eliminate any jamming of the coupon 28 along the path 27.

According to this solution, the wheels 32 are rotatingly mounted in part on the fixed structure 11, and in part on the access door 31a, on opposite sides with respect to the path 27, so as to cooperate together in order to feed the coupon 28 along the path 27.

As anticipated earlier, reading of the coupon 28 is followed by printing, using the printer 12, of a receipt 22b which is issued to the player, as proof of the bet made, and reproducing in particular the games data marked on the coupon 28.

Optionally, on the outer surface of the casing 11, the terminal 10 may include a device, generically designated with numeral 33, for the reading/writing of electronic cards in general, also called chip cards, and more in particular for smart cards, and/or for simple memory cards.

The structure and combination of parts described above are such as to confer on the terminal 10 special characteristics of serviceability, simplicity and practicality of use.

In particular the terminal 10 has a very compact structure which, in a very low amount of space, integrates the typical functionalities of a terminal for controlling games, and which is also characterized by the presence of an upper cover, on which a keyboard for entering data is rigidly mounted, and a screen for displaying data, fulcrum-mounted on this upper cover so as to be tiltable.

By way of this structure, the terminal 10 is highly serviceable and practical to use, both under normal working conditions, with the upper cover 13 closed on the casing 11 and the display screen 16 tilted according to the desired angle of inclination with respect to the cover 13, for reading games coupons 28 compiled by the users and for issuing corresponding receipts 22b, and also in those situations in which action needs to be taken to perform maintenance operations on the inside of the terminal 10, such as to open the cover 13, for example to replace a finished roll of paper 22 with a new one.

In particular, for clarity's sake, FIG. 4 represents the configuration assumed by the terminal 10 during its nominal working conditions, with the cover 13 closed and the display screen 16 placed according to the desired angle of inclination, whereas FIG. 2 shows the configuration assumed by the terminal 10 when, for maintenance operation needs, the upper cover 13 has to be opened.

Clearly changes and improvements may be made to the electronic terminal 10 described up to here, without departing from the scope of this invention.

The invention claimed is:

1. An electronic terminal, for the management of games, comprising:
a main housing defining an enclosure, the main housing having a left side, a right side, a front side, and a rear side,
a printer and roll of paper for the printer housed inside said main housing, wherein said printer is centrally located between the left side and the right side,
an upper cover fulcrum-mounted on the rear side of said main housing in a fulcrum-mounting zone, the upper cover having a first edge adjacent to the fulcrum-mounting zone, a second edge opposed from the fulcrum-mounting zone, and a central zone located between the first edge and the second edge, the upper cover being movable between a closed position on said main housing, and an open position raised with respect to said main housing, wherein the printer and roll of paper are accessible from outside the main housing when the cover is in the open position,
a keyboard for entering data, the keyboard mounted on the upper cover adjacent the second edge,
a screen for displaying data processed by said terminal, and
a pass-through slot centrally located on said upper cover between said screen and said keyboard, to allow the issue to the outside of a receipt printed by said printer,
wherein said screen is rotatably mounted to the central zone of said upper cover by an edge of said screen, whereby said screen is tiltable about said edge with respect to said main housing when said upper cover is in said closed position between a first position wherein said screen is folded against the upper cover, and a second position wherein said screen is raised with respect to the upper cover, wherein said screen is user-accessible when in said first position and when in said second position;
wherein said slot is parallel to a side of the keyboard facing the central zone on which the edge of said screen is rotatably mounted;
wherein said roll of paper is arranged to rotate around an axis parallel to said slot;
a path for the reading of documents inserted in said terminal, and an access door mounted on the front side of said main housing to cover said path, wherein the access door is removable from said front side of said main housing to completely uncover said path; and
a plurality of rollers located along said path for feeding said documents along said path, wherein said plurality of rollers includes at least a first roller located on the front side of said main housing, and at least a second roller located on said access door.

2. The terminal according to claim 1, further comprising at least one support post pivotably mounted to a rear side of said display screen, wherein the support post is pivotable into a position where it extends from the rear side of said display screen and engages the upper cover to support said display screen in at least one inclined position with respect to said upper cover, when the upper cover is in the closed position with respect to the main housing.

3. The terminal according to claim 2, wherein said at least one support post is connected to the rear side of said display screen by a third hinge.

4. The terminal according to claim 1, wherein said upper cover defines an exterior surface and a recess in the exterior surface, wherein the edge of said display screen about which the display screen is rotatable is located along a peripheral edge of the recess, and the recess is shaped and configured to receive said display screen when in the first position such that a portion of the display screen is flush with the exterior surface of said upper cover.

5. The terminal according to claim 1, wherein said path extends between an inlet aperture and an outlet aperture located on the front side of said main housing, wherein the inlet aperture and the outlet aperture are centrally located between the left side and the right side of said main housing.

* * * * *